Jan. 31, 1956   R. R. GUNDERSON   2,733,033
HOSE SUPPORT FOR VEHICLES
Filed April 5, 1951   2 Sheets-Sheet 1

INVENTOR:
RALPH R. GUNDERSON
BY: Schroeder, Merriam,
Hofgren, + Brady,
ATTORNEYS Jan. 31, 1956　　　R. R. GUNDERSON　　　2,733,033
HOSE SUPPORT FOR VEHICLES Filed April 5, 1951　　　　　　　　　　2 Sheets-Sheet 2

INVENTOR:
RALPH R. GUNDERSON
BY: Schroeder, Merriam,
Hofgren, & Brady.
ATTORNEYS

United States Patent Office 2,733,033
Patented Jan. 31, 1956

2,733,033
HOSE SUPPORT FOR VEHICLES
Ralph R. Gunderson, Chicago, Ill.

Application April 5, 1951, Serial No. 219,456

7 Claims. (Cl. 248—51)

This invention relates to a spring support for holding tractor-trailer brake hoses, and more particularly to an improved flexible support which has a coupling receiver to which the coupling fittings on the hose members may be attached when they are not connected to the trailer fittings.

The primary object of the invention is to provide an improved yielding support for vehicle hose lines which can be secured to the tractor frame and does not require any connection with the cab of the tractor.

A further object of the invention is to provide a backlash snubber which will not permit the spring support to swing forwardly sufficient to strike the cab of the tractor.

The invention is illustrated in a preferred embodiment in the accompanying drawings, in which—

Figure 1:
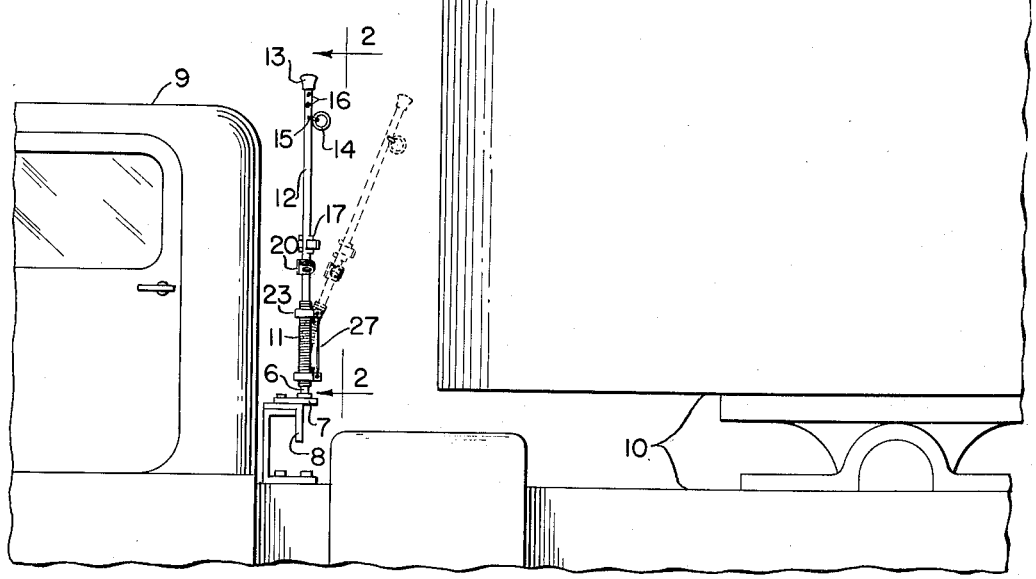
Figure 2:
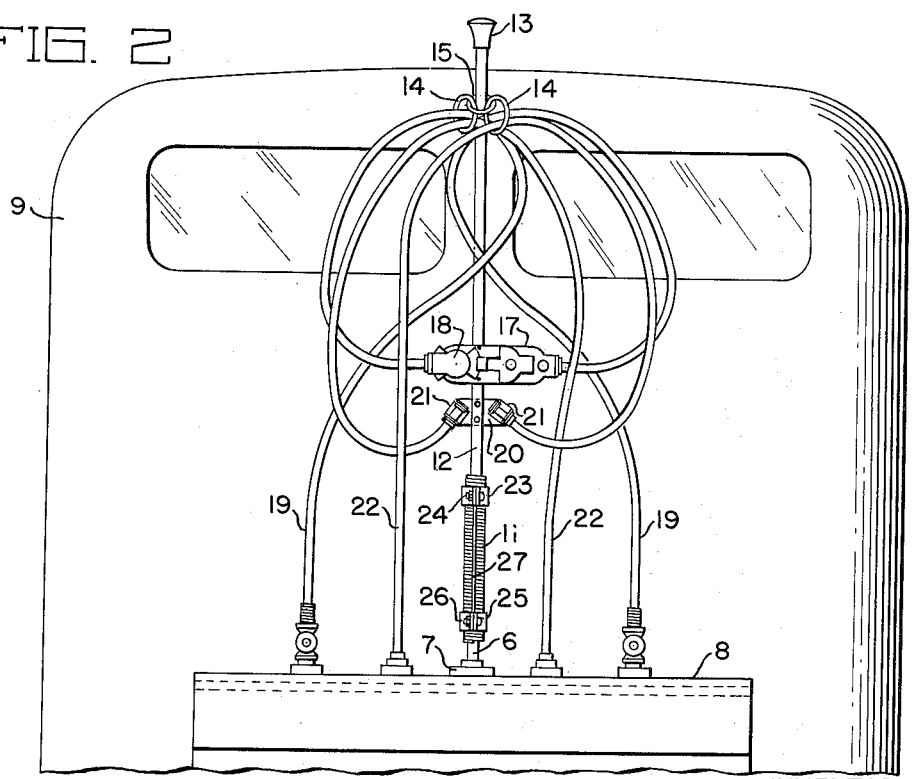
Figure 3:
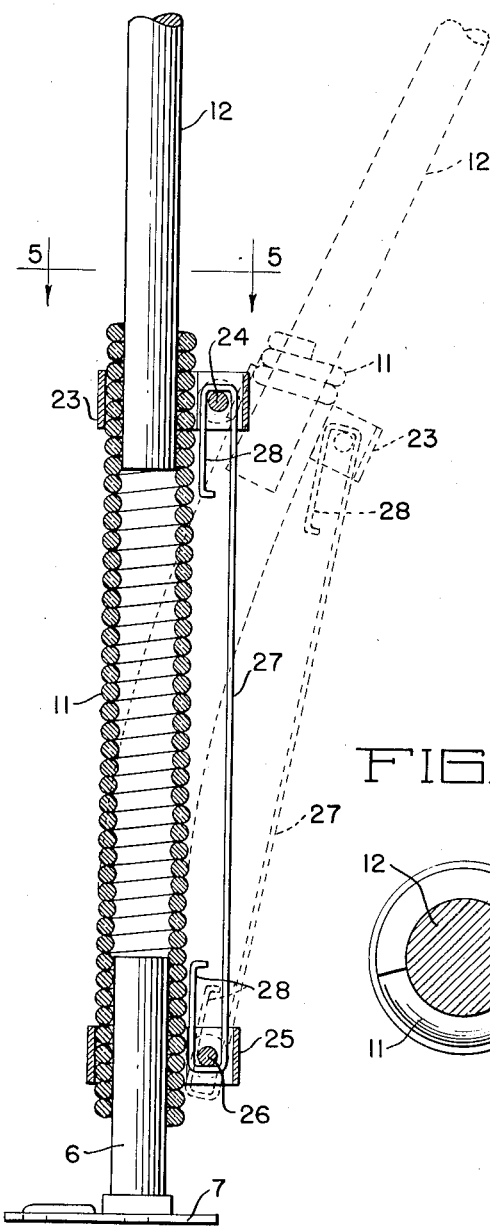
Figure 4:
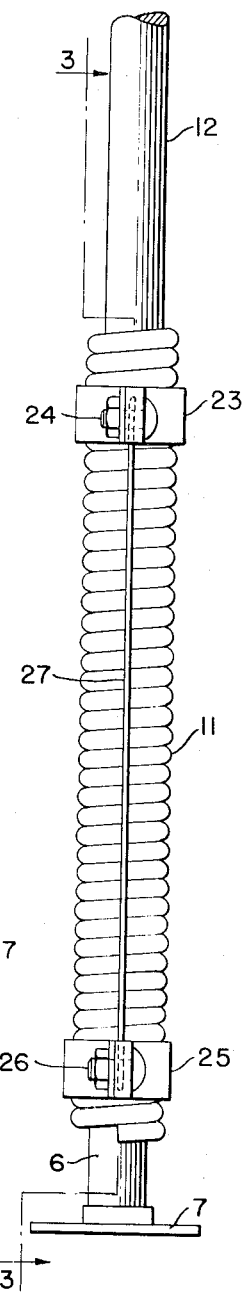
Figure 5:
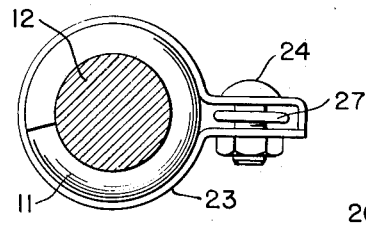

Fig. 1 is a side elevational view showing how the device may be mounted in rear of the cab of a tractor equipped with a trailer; Fig. 2, a rear elevational view of the device, taken as indicated at line 2—2 of Fig. 1; Fig. 3, an enlarged fragmentary vertical sectional view, taken as indicated at line 3—3 of Fig. 4; Fig. 4, an enlarged fragmentary rear elevational view of the lower portion of the device; and Fig. 5, a plan sectional view, taken as indicated at line 5—5 of Fig. 3.

In the embodiment illustrated, a rigid base post 6 has a bracket 7 which is adapted to be bolted to a tractor frame 8. In Figs. 1 and 2, the cab of the trailer is indicated at 9 and a trailer portion at 10.

As best shown in Fig. 3, the lower end of a heavy coil spring 11 frictionally grips the post 6. In a like manner, its upper end grips a light tubular staff 12 which extends upwardly and may be provided at its top with an ornamental cap 13. A pair of rubber rings 14 are held by a metal bail 15 which is adjustably secured to the staff 12 by engagement at a selected pair of opposed holes 16.

As best shown in Fig. 2, a coupler receiver 17 is adjustably secured to the staff 12, and has blank "glad hand" couplings to which the couplers 18 on the vacuum lines 19 may be releasably attached. Another coupler 20 has fittings 21 to receive the end couplings of the high pressure hoses 22.

The blacklash snubber has an upper clamp 23 encircling the upper portion of the spring 11 and is held tightly by a bolt 24. In like manner, a lower clamp 25 encircles the lower part of the spring and is held by a bolt 26. A steel wire 27 has looped end portions 28 which make lost motion connections with the bolts 24 and 26.

When the trailer is disconnected, the hoses may be fastened on the back of the tractor, as shown in Fig. 2. As the staff is on a tiltable spring mounting, it would have a tendency to strike against the back of the cab when the vehicle stops suddenly or encounters a bump in the road. The backlash snubber prevents the staff from hitting the cab, but does not interfere with its lateral or rearward swinging motions, as indicated by dotted lines in Figs. 1 and 3, when the hose is tensioned due to a turning action of the vehicle with respect to its trailer.

The foregoing detailed description is given for clearness of understanding only, and no unnecessary limitations should be understood therefrom, for some modifications will be obvious to those skilled in the art.

I claim:

1. A yielding support for vehicle hose lines comprising: a rigid base post adapted to be secured to a tractor frame; a stiff coil spring secured to said post in upright position; a staff secured to the upper portion of said spring and being tiltable with respect to the base post; supporting means on the upper portion of said staff for holding flexible hose members; and a flexible backlash snubber offset rearwardly from the spring and being connected at one end to said base post and at the other end to said staff so as to limit the forward tilting of the staff.

2. A device as specified in claim 1, in which the backlash snubber comprises a clamp secured to the upper portion of the spring, a holder near the lower portion of the spring, and a strong wire connecting said clamp and holder.

3. A device as specified in claim 1, in which the backlash snubber comprises a clamp secured to the upper portion of the spring, a second clamp secured to the lower portion of the spring, and a wire attached to one of said clamps, said wire having a loop making a lost motion connection with the other clamp.

4. A device as specified in claim 1, in which the coil spring embraces and frictionally grips the connecting end portions of the post and staff, and the backlash snubber includes a pair of spaced clamps encircling said spring where it embraces the post and staff, and a flexible connection between said clamp.

5. A device as specified in claim 1 in which the upper portion of the staff is provided with a ring to receive a hose, and the lower portion of the staff has a coupling receiver to which a coupling fitting on the free end of a hose may be releasably attached.

6. A yielding support for vehicle hose lines comprising: a rigid base post adapted to be secured to a tractor frame, a stiff coil spring secured to said post in upright position; a staff having a lower end secured to the upper portion of said spring to provide a longitudinally flexible medial portion in said coil spring between said base post and said lower end to permit forward and rearward tilting of the staff with respect to the base post; supporting means on the upper portion of said staff for holding flexible hose members; a clamp secured to the support above said longitudinally flexible medial portion; a second clamp secured to said support below said longitudinally flexible medial portion; and an elongated element attached to one of said clamps and making a lost motion connection with the other of said clamps.

7. A yielding support for vehicle hose lines comprising: a rigid base post adapted to be secured to a tractor frame; a stiff coil spring secured to said post in upright position; a staff having a lower end secured to the upper portion of said spring to provide a longitudinally flexible medial portion in said coil spring between said base post and said lower end to permit forward and rearward tilting of the staff with respect to the base post; supporting means on the upper portion of said staff for holding flexible hose members; a pair of rearward extensions rigidly secured to the support, one of said extensions positioned above said flexible medial portion, and the other of said extensions positioned below said flexible medial portion; and means offset rearwardly from the spring to permanently connect said lateral extensions to limit forward tilting while permitting flexing of the medial portion of the coil spring to tilt the staff rearwardly.

(References on following page)

References Cited in the file of this patent

UNITED STATES PATENTS

| | | |
|---|---|---|
| 452,334 | Beery | May 12, 1891 |
| 504,866 | Davenport | Sept. 12, 1893 |
| 547,731 | MacLeann | Oct. 8, 1895 |
| 1,157,418 | Polson et al. | Oct. 19, 1915 |
| 1,388,719 | Johnston | Aug. 23, 1921 |
| 1,458,916 | Sampson | June 12, 1923 |
| 1,476,395 | Davis | Dec. 4, 1923 |
| 1,527,774 | Bettencourt | Feb. 24, 1925 |
| 1,752,193 | O'Hanlon | Mar. 25, 1930 |
| 1,762,966 | Ellinger | June 10, 1930 |
| 1,921,207 | Robinson | Aug. 8, 1933 |
| 2,149,549 | Reis | Mar. 7, 1939 |
| 2,513,651 | Kirksey | July 4, 1950 |
| 2,554,176 | Edwards | May 22, 1951 |
| 2,564,041 | Vogel | Aug. 14, 1951 |